United States Patent [19]

Riout

[11] Patent Number: 4,863,117

[45] Date of Patent: Sep. 5, 1989

[54] PROFILED WING FOR CONTROLLED DEFORMATION AND APPLICATION THEREOF TO BEATING WING AIRCRAFT

[76] Inventor: Roland Riout, 12, rue du Vignemale, 31240 L'Union, France

[21] Appl. No.: 141,667

[22] Filed: Jan. 7, 1988

[30] Foreign Application Priority Data

Jan. 7, 1987 [FR] France .................................. 87 00203

[51] Int. Cl.$^4$ ................................................. B64C 3/38
[52] U.S. Cl. ..................................... 244/48; 244/219; 244/22; 244/46; 416/147
[58] Field of Search ....................... 244/46, 48, 11, 22, 244/28, 72, 90 R, 219; 416/147

[56] References Cited

U.S. PATENT DOCUMENTS

| | | | |
|---|---|---|---|
| 1,145,013 | 7/1915 | Gallaudet | 244/48 |
| 1,526,230 | 2/1925 | Pescara | 416/147 |
| 2,017,534 | 10/1935 | Gray | 244/22 |
| 2,584,663 | 2/1952 | Bensen | 416/147 |
| 4,330,100 | 5/1982 | Elber | 244/48 |

FOREIGN PATENT DOCUMENTS

103746  7/1926  Austria .................................. 244/48

Primary Examiner—Joseph F. Peters, Jr.
Assistant Examiner—Rodney Corl
Attorney, Agent, or Firm—Harold H. Dutton, Jr.

[57] ABSTRACT

The invention relates to a contoured wing intended to serve as a airfoil or a blade. This wing comprises a longitudinal stringer (3), a plurality of juxtaposed wing sectors (1, 2), each articulated about the stringer, a series of cranks (7), each crank associated with a sector in such a manner as to fix the angular position thereof about the stringer, and a control device (10) for the cranks, able to cause their pivoting. The wing according to the invention permits control of the angle, continuously and progressively variable along the contour. It may particularly be applied for use in beating wing aircraft.

15 Claims, 10 Drawing Sheets

PROFILED WING FOR CONTROLLED DEFORMATION AND APPLICATION THEREOF TO BEATING WING AIRCRAFT

This invention relates to a contoured or profiled wing capable of controlled, variable deformation along its profile. By "contoured wing" is meant, in a general manner any contoured element intended to be arranged relatively quickly in a fluid in order to develop supporting and/or propulsion forces, or to recover energy therefrom, or to furnish energy. This term extends also to airfoils, aircraft blades (for airplanes, helicopters, etc.), as well as to windmill blades, aircraft or marine propellers etc. The invention relates more particularly, but not exclusively, to the application such a contoured wing for use in a so-called "beating wing" aircraft.

BACKGROUND AND OBJECTS OF THE INVENTION

The wings of an airplane have an angle of incidence which is generally not controllable along their profile, whereas, the blades of helicopters and of certain propellers have a variable pitch of which the variations may be controlled but which remain constant along the profile of the blade (only varying the same angle over the entire span). As is well known, it is not possible under such conditions to benefit from an optimum aerodynamic efficiency over the length of the profile for very different working conditions, and the determination of the contours is made for achieving the best compromise in each application. This deficiency is a particularly serious inconvenience for "beating wing" airplanes in which the wings pass through a cycle of very different aerodynamic conditions. The principle of these airplanes is now well known, but they have not been particularly well developed in practice because of this type of problem.

French Pat. Nos. 1,368,710 and 1,430,071 propose a propeller with variable overall pitch which, in order to control the angle, may undergo weak corrections of different amplitude according to the sections of the contour in order to reduce the incident angle of sections of the profile near the hub. This propeller is divided along its length into several sectors, each mounted with a certain play between two stops: the corrections are carried out completely or not at all at the point of each sector by means of a fluid which exerts upon the sector under consideration a pressure causing it, at the end of the angle control, to return to the rear over a small course of travel against the surface of the corresponding stop. However, the same principle of this propeller limits the corrections possible to very slight amplitudes and does not permit obtaining, over different conditions, an angle over the profile close to the optimum angle. For example, for aircraft with beating wings, it would not be possible with this principle to continuously and progressively control the angular position of the various sectors of the wing as a function of the position of the wing in the beating cycle.

BRIEF DESCRIPTION OF THE INVENTION

The present invention provides an improved contoured wing, permitting a continuous and progressive angle control, variable along the profile of the wing (the term "contoured wing" being understood in the general sense indicated above).

By convention, the "longitudinal" direction is deemed to be parallel to the attack (or leading) edge or trailing edge of the wing, the "transverse" direction is perpendicular thereto, extending along a chord of the contour, and "frontal" is the direction orthogonal to the first two directions extending along the thickness of the contour.

The profiled wing provided by the invention comprises an axial stringer, a plurality of wing sectors or segments juxtaposed along the wing, each being articulated on the stringer so as to be able to pivot about the stringer, and means for angularly positioning said sectors about the stringer. According to the present invention, the angular positioning means for the sectors comprises, first, a series of cranks or levers, one associated with each sector in such a manner as to fix the angular position of that sector with respect to the stringer, and a device for controlling the cranks and capable of causing their pivoting for conferring upon each of the cranks a position determined as a function of the angle of incidence desired for each wing sector.

According to a preferred embodiment, each crank associated with a given wing sector is carried by the preceding sector and articulated thereon about a transverse axis. Each crank comprises a first arm connected to the control device for controlling the rotation of that crank with respect to the preceding sector, and a second arm articulated about the wing sector under consideration for conferring on that sector an angular position determined with respect to the stringer, in order to thus assign to different sectors of the wing, variable angles by progressive modifications.

According to another embodiment, each crank associated with a given sector of the wing is carried by the stringer and articulated about a transverse axis on a flange fixedly connected to the stringer. Each crank comprises a first arm connected to the control device for controlling the rotation of that crank and a second arm actuating the wing sector under consideration and of a length adapted to control the angle of that sector.

Thus, the wing according to the invention has a variable pitch being characterized in that during the course of variation, the contour changes by the incident angle to a different angle for the various sectors between the wing connection to the aircraft and the tip of the wing in such a manner that it is possible to attain significant differences of the angle from the line of connection of the wing to the aircraft to the tip of the wing by means of identical cranks, of a small size, while, in the second embodiment, there are different lengths of the cranks which define different angles between sectors.

In many applications, the variations of the angles must be much greater at the tip of the wing than at the connection to the body of the aircraft, and the first embodiment will be preferred. The second embodiment will be selected in the more rare case where other variation standards are desirable along the contour.

Each sector of the wing may be formed by one or more ribs arranged in a transverse plane and by a rigid structure such as a caisson, cradle, triangular support structure. One or more of said ribs may be securely fastened to the rigid structure for forming a unitary articulated assembly around the stringer. In the first embodiment indicated above, it is also possible, as will be seen below, to articulate in an independent manner the rigid structure and the rib of each sector, in order to permit an adjustment of the angle independent of each sector.

Further, each sector may be covered with a deformable covering surface supported by two ribs. In particular, this covering comprises, at the level of each sector, a top face contour and a bottom face contour, each able to undergo a twisting action and disposed against the ribs in such a manner as to be able to slide independently one from another when these ribs assume different angles. In spite of the differences of the angles along the contour, there is thus insured a continuity of the surface thereof.

In the case in which the wing is caused to have a cyclic movement (for example in a beating wing aircraft wherein each cycle corresponds to one beat), the control device for the cranks is associated with cyclic actuating means, situated at the juncture of the wing with the fuselage and adapted to actuate repetitively the control device through the operating cycles. These means may comprise a cam system or a programmed robot, permitting the adjustment of the angle of each sector as a function of the position of the wing in the operating cycle.

Further, the structure of the wing according to the invention suits itself to an overall controlled changing of the general angle thereof (for example, to permit the steering of bearing wing aircraft). It is sufficient to mount the first crank near the juncture of the wing in such a manner that it is moveable along the frontal direction (in the sense of the thickness of the contour) and to provide maneuvering means permitting varying the position of this first rudder.

The invention is applicable to any contoured aerodynamic element: aircraft or marine propeller, windmill blade, aircraft blade, aircraft airfoils. It is more particularly adapted for use in an aircraft with beating wings comprising a fuselage and at least two contoured wings according to the invention. These wings are articulated to the fuselage and associated with driving means (hydraulic, mechanical . . . ) capable of moving them according to the beating cycles. Each contoured wing comprises cyclic actuating means adapted to confer upon the sector of the wing a cyclically variable angle as a function of the position of the wing in the beating cycle.

DESCRIPTION OF THE DRAWINGS

The invention having been described in a general form, the description which follows with reference to the attached drawings, while presenting by way of non-limiting examples several embodiments and one application to airplanes with beating wings; in the drawings which form an integral part of the present description.

DESCRIPTION OF PREFERRED EMBODIMENTS

Figure 1:
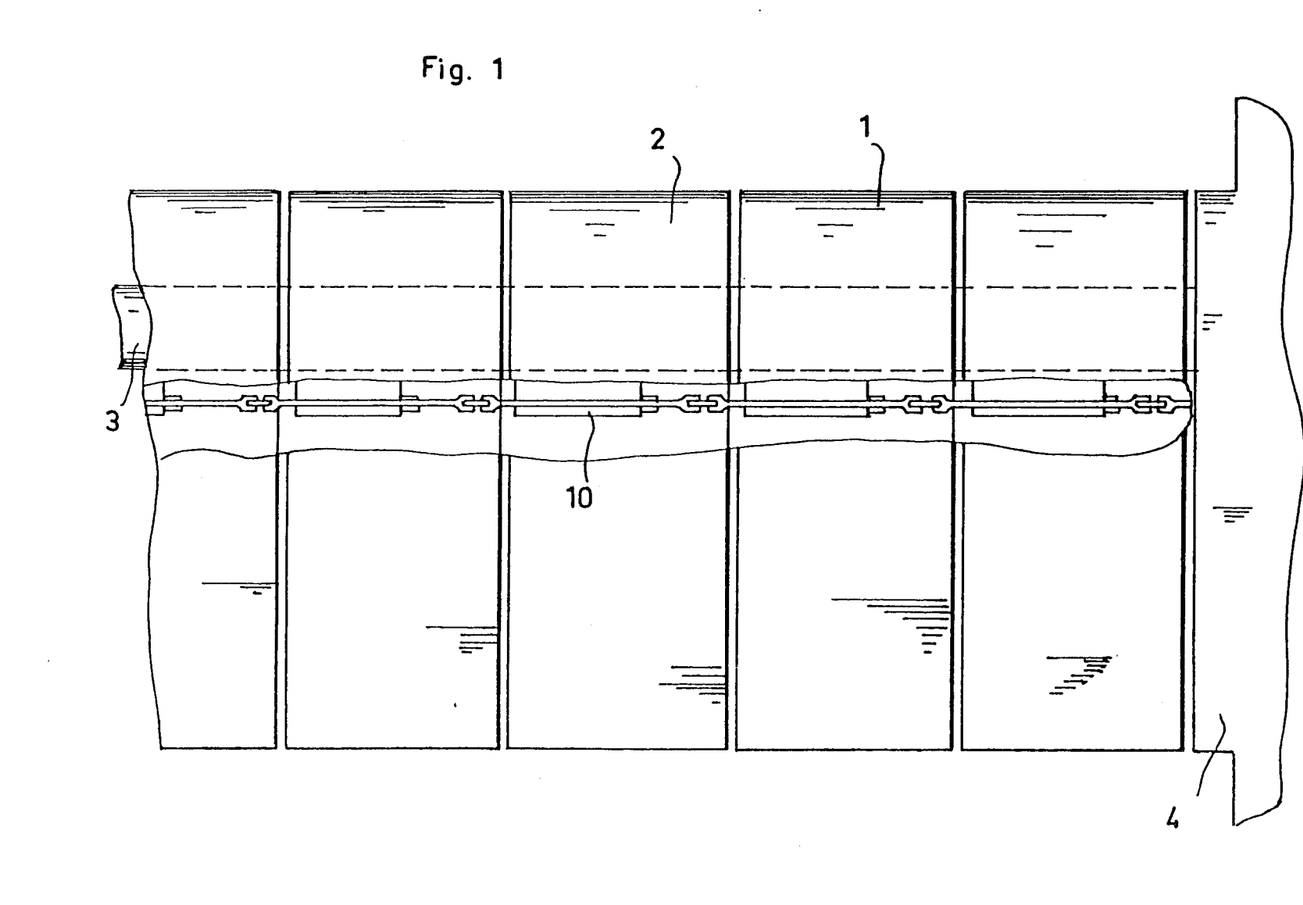
FIG. 1 is a partial plan view of a contoured wing according to a first embodiment.
Figure 2:
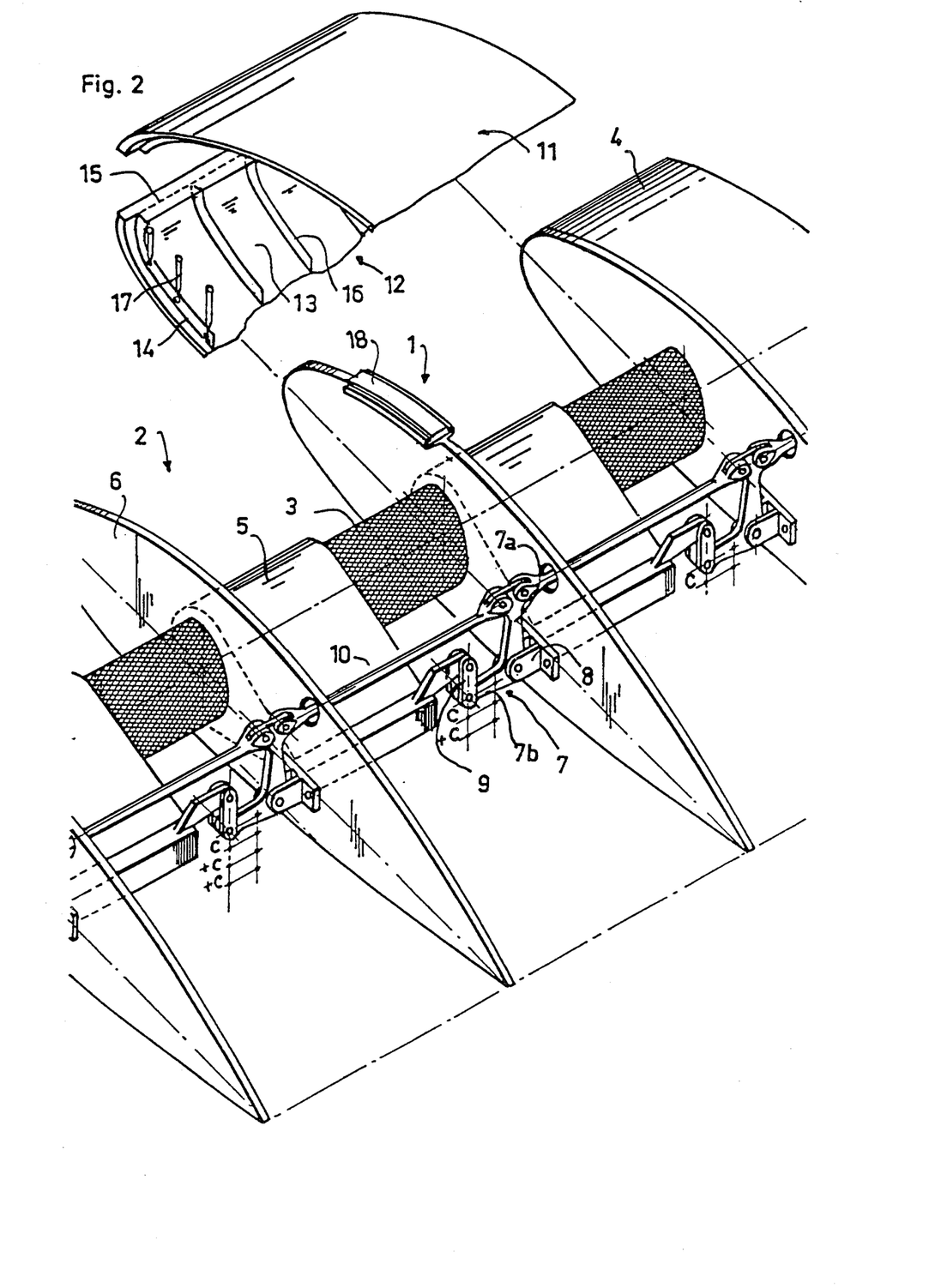
FIG. 2 is an exploded, partial perspective view with portions of the covering broken away, the sectors being shown in a neutral position with equal angle.
Figure 3:
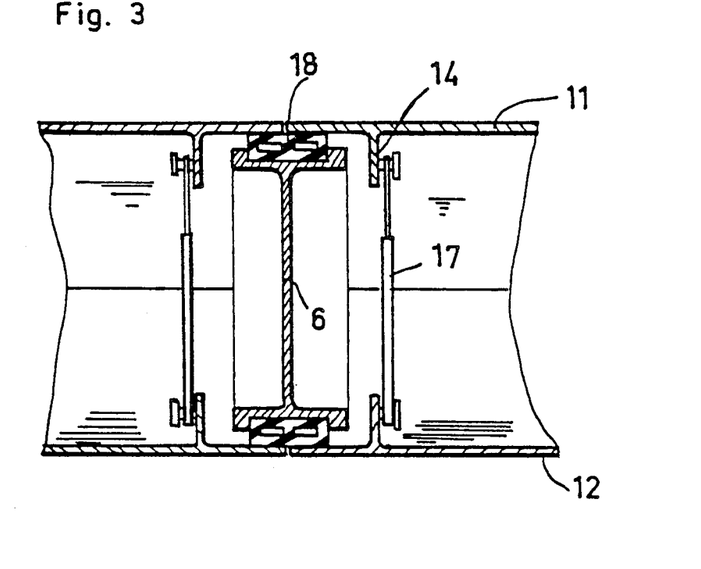
FIG. 3 is a detailed cross sectional view showing the junction of the profiles of the covering against a rib.

The profiled wing shown by way of example in FIGS. 1, 2 and 3 comprises a plurality of sectors such as 1, 2 placed side by side and articulated along a stringer 3 which, in this example, comprises a tubular member extending the full length of the longitudinal direction of the wing.

On one side, this stringer is unitary with a fixed caisson recess 4 which is fixed to a supporting element, depending upon the application: fuselage, hub, central cone of a rotor, etc. On the other side of the stringer, an elastic member may be provided for maintaining the caissons in juxtaposed position.

Further, as will be seen below, rollers may in certain cases be provided between caissons for facilitating their relative rotation. The caissons may also be keyed longitudinally along the stringer in such a manner as to be able to pivot there-around without sliding longitudinally.

Each sector comprises a rigid structure, in the example a cradle 5, to the edge of which is fixed a transverse rib 6 and the cross section of which corresponds to the desired profile of the wing at that point.

Each sector is provided with a crank 7 which is supported by the preceding sector (rib or rigid structure) in order to assign to the particular sector a controllable angle as desired, different from the angle of the other sectors. In the example, each crank 7 is articulated about a transverse axis on a flange 8 fixed to the rib of the preceding sector and comprises two arms: a first arm 7a in the general frontal direction which is connected to a control device, and a second arm 7b in a longitudinal direction which is articulated by the interposition of a link 9 and the transverse axes on the cradle of the sector under consideration. The first crank (nearest the juncture of the wing to the fuselage) is borne by the fixed caisson 4.

The control device comprises control rods such as 10 which are articulated around their transverse axes on the first arms 7a of the levers in such a manner as to connect them two by two.

The connecting rod at the wing juncture may be actuated by any means as a function of the particular application in order to ascribe variable angles to different sectors. In FIG. 2, there is shown schematically the neutral position where all of the sectors have the same angle. Starting with the position, an action on the connecting rod at the juncture modifies the angles of the sectors progressively from the juncture to the end of the wing, the angular displacement -c- being added from one sector to another. As will be understood, a different standard of modifications of the angle along the section may, in certain cases, be provided by modifying the lengths of the arms 7a and 7b of the cranks, or the link 9 or by the addition of cams as will be described in a variation hereinafter.

Additionally, the surface of each sector is covered by a deformable covering connected to two ribs: the rib 6 of the sector considered and the rib of the adjacent sector.

This covering comprises at the level of each sector a top surface 11 and a bottom surface 12. Each of these surfaces is formed by a flexible covering sheet 13 carried by stiffeners in such a manner that the assembly is capable of undergoing a twisting action.

In the example shown in FIGS. 2 and 3, two stiffeners such as 14 are provided laterally on the edges of each top surface or bottom surface in order to overlap the ribs 6; two stiffeners such as 15 are situated along the leading edge and the trailing edge in order to form sliding areas of the top surface contour and bottom surface contour one with respect to the other; and several intermediate stiffeners such as 16 are situated in the transverse plane.

The profile of the wing is maintained closed by means of connecting members such as 17 which connect the top surface profile and the bottom surface profile in such a manner as to keep them urged against the ribs, while permitting their relative sliding. In the example, these connecting elements comprise small links 17 articulated to the lateral stiffeners of the top surface and bottom surface. It is also possible to provide elastic means such as springs or the like.

When the angles of the sectors change, the cross sections of the top surface and bottom surface guided by the rib twist and slide one with respect to the other, in such a manner that there is assured a continuity of the contour at the point of the covering. For increasing the flexibility of deformation during warping of the profile, the top surface profile and bottom surface profile are preferably arranged for support against the ribs 6 with interposition of an elastic strip 18 as shown in FIG. 3.

Figure 4:
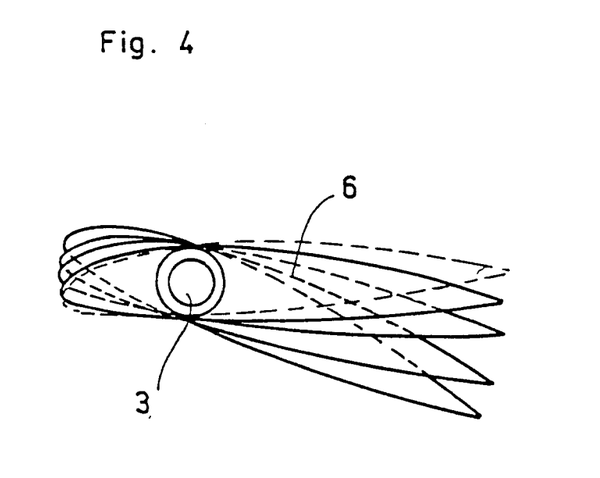
FIG. 4 is a schematic view illustrating different angles of several sectors for one configuration of the wing.

FIG. 4 illustrates the increasing angles from the juncture of the wing to the tip of the wing that may be assumed by the various sectors when the control rods are actuated (in this figure, only the ribs of the sectors have been shown for the sake of clarity).

Additionally, FIGS. 5, 6, 7 and 8 show a variation of the previously described wing, in which the variation of the angle of incidence of each sector may be adjusted according to the variation standard provided by a cam 19 fitted with each sector and a profile adapted to this variation standard.

In this variation, each sector comprises a rigid structure 20 (trunnion or triangular structure) and a rib 21 which are articulated in an independent manner around the stringer 22. The lever 23 of each sector is carried by the trunnion of the preceding sector and as before, is controlled by connecting rods 24 in such a manner as to define the angular position of the trunnion under consideration by the interposition of a connecting link 25.

However, the rib 21 has in this variation a pivotal movement which is defined, not only by the trunnion but also by complimentary angle positioning means which establish, upon manipulation of the levers, an independent individual adjustment of the angle of each rib.

This positioning means comprises, for each rib, the cam 19 mentioned above which is fixed to the extremity of each lever in the extension of the control rods 24 so as to follow the same movement as the control rods.

This cam travels between a roller follower 26 fixed to the trunnion and a driven roller 27 fixed to the rib. Elastic means such as a spring 28 connects the trunnion and the rib in order to maintain the roller bearing and the driven roller under pressure against the cam 19.

Thus, when the connecting rods 24 are actuated, the cam 19 displaces the roller 27 which causes a corresponding rotation of the rib around the stringer. It should be noted that the trunnion also undergoes an analogous pivotal motion to that of the preceding embodiment. These arrangements thus permit an accumulation of the angles of the sectors, while benefitting from the possibility of adjusting in a flexible manner the angle of each rib. (If the faces of the cam 19 were parallel, the rib would undergo an identical pivoting to the trunnion as in the previous case.)

Further, in the embodiment of FIGS. 5-8, the trunnions are supported laterally one against the other by one or more rollers such as 42 which favor the rotation with reduced friction of two contiguous trunnions one with respect to the other about the stringer. As the case may be, these rollers may be replaced by slide bearings. The cradle (or caisson) of the end sector (the side adjacent the fuselage or the hub) comes into contact by a roller or slide bearing against the fixed trunnion or caisson mentioned above, however, the caisson or trunnion of the sector of the opposite extremity (tip of the wing) is urged toward the neighboring sector by elastic means maintaining the stacking of the sectors in positions coupled by their rollers. These rollers may, in certain cases, be oriented along a spaced angular direction with respect to the transverse direction in such a manner as to rigidify the stringer.

Figure 5:
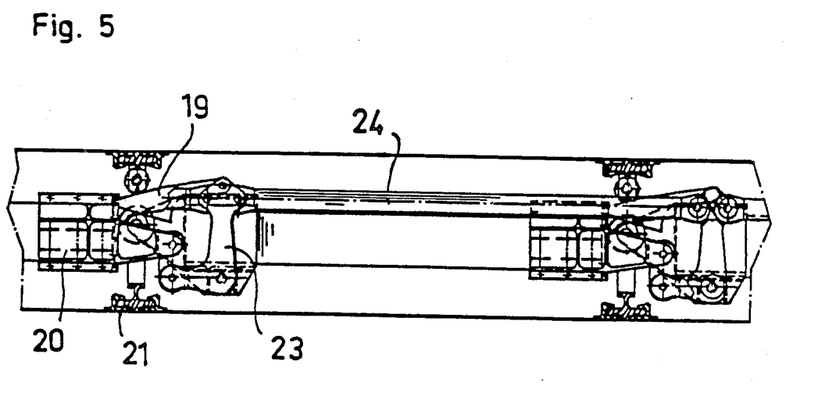
FIG. 5 is a schematic view of a variation of a sector of the wing, viewed from the trailing edge (with covering removed)
Figure 6:
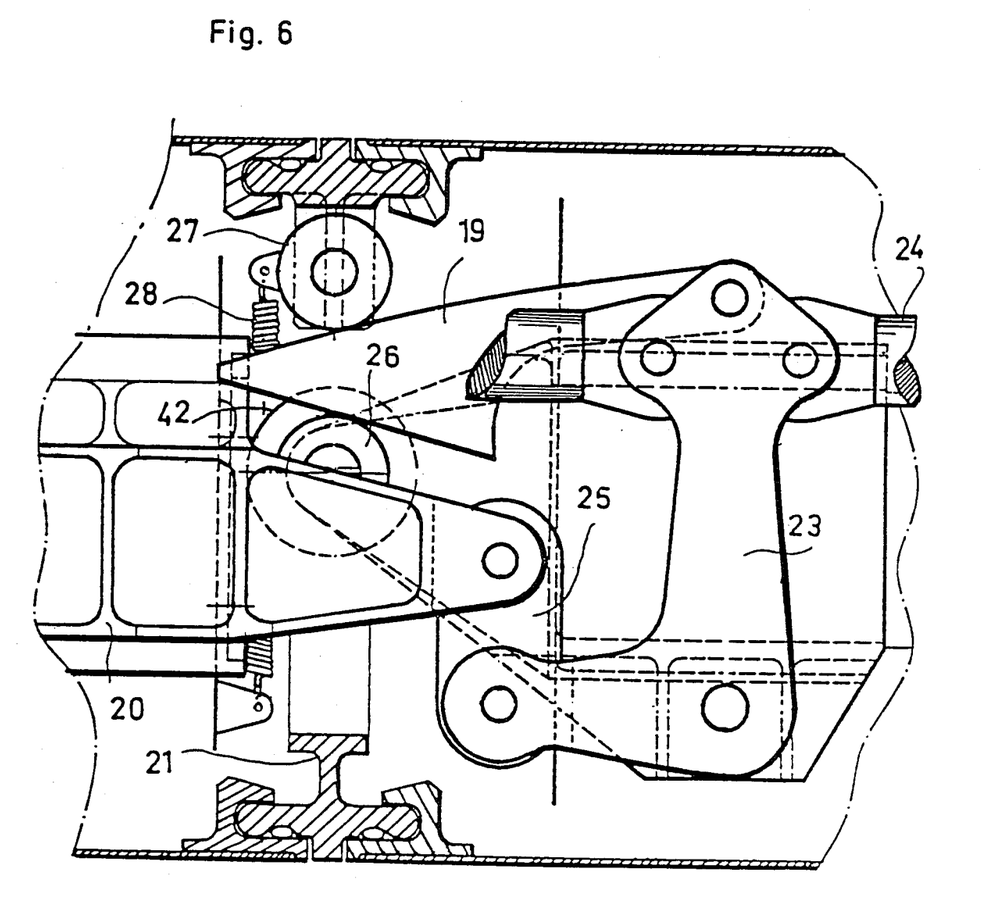
FIG. 6 is a detailed view of a portion of FIG. 5 on an enlarged scale.
Figure 7:
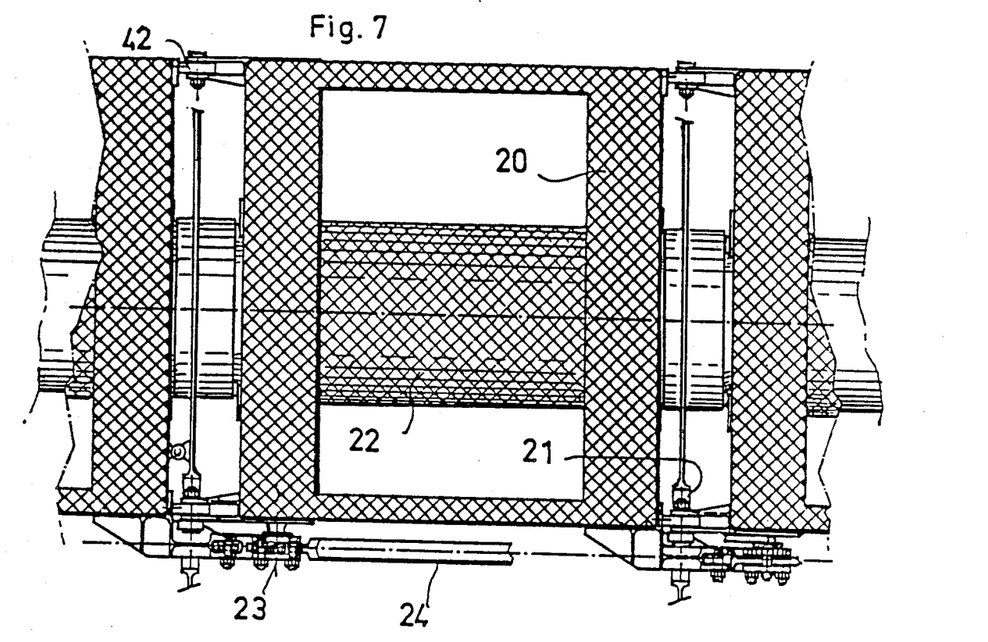
FIG. 7 is a partial plan view of said variation (with the covering removed)
Figure 8:
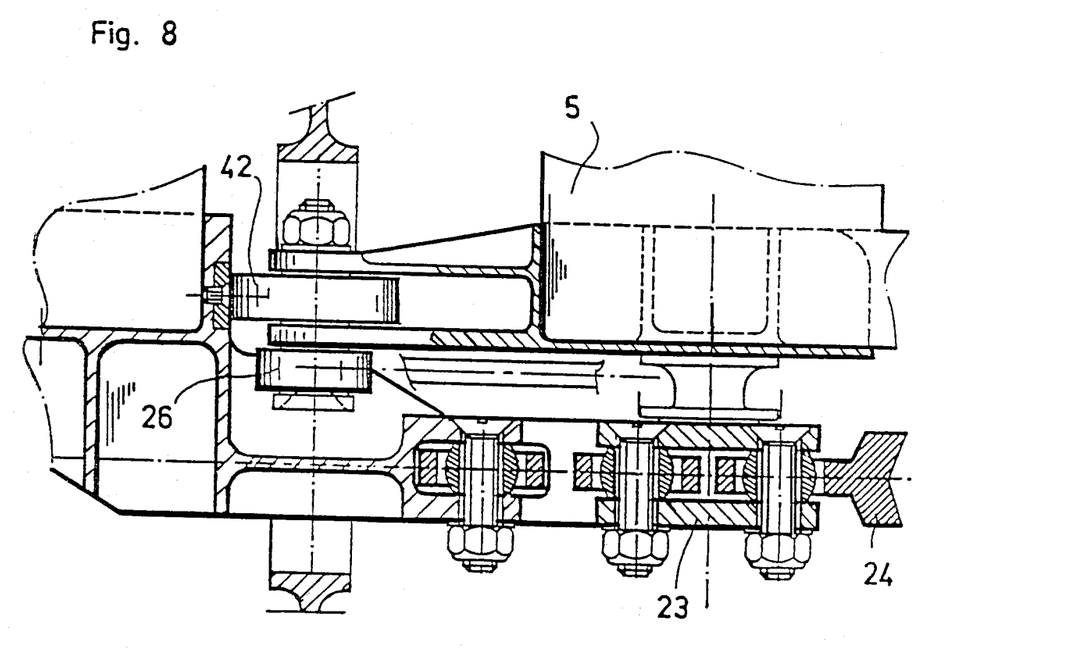
FIG. 8 is a detailed view of a portion of FIG. 7 on an enlarged scale.

Moreover, in the embodiment of FIGS. 5 and 6, the top surface and bottom surface are maintained along the periphery of the ribs by articulated and sliding joints, which replace the connecting links 17 of FIGS. 2 and 3.

Figure 9:
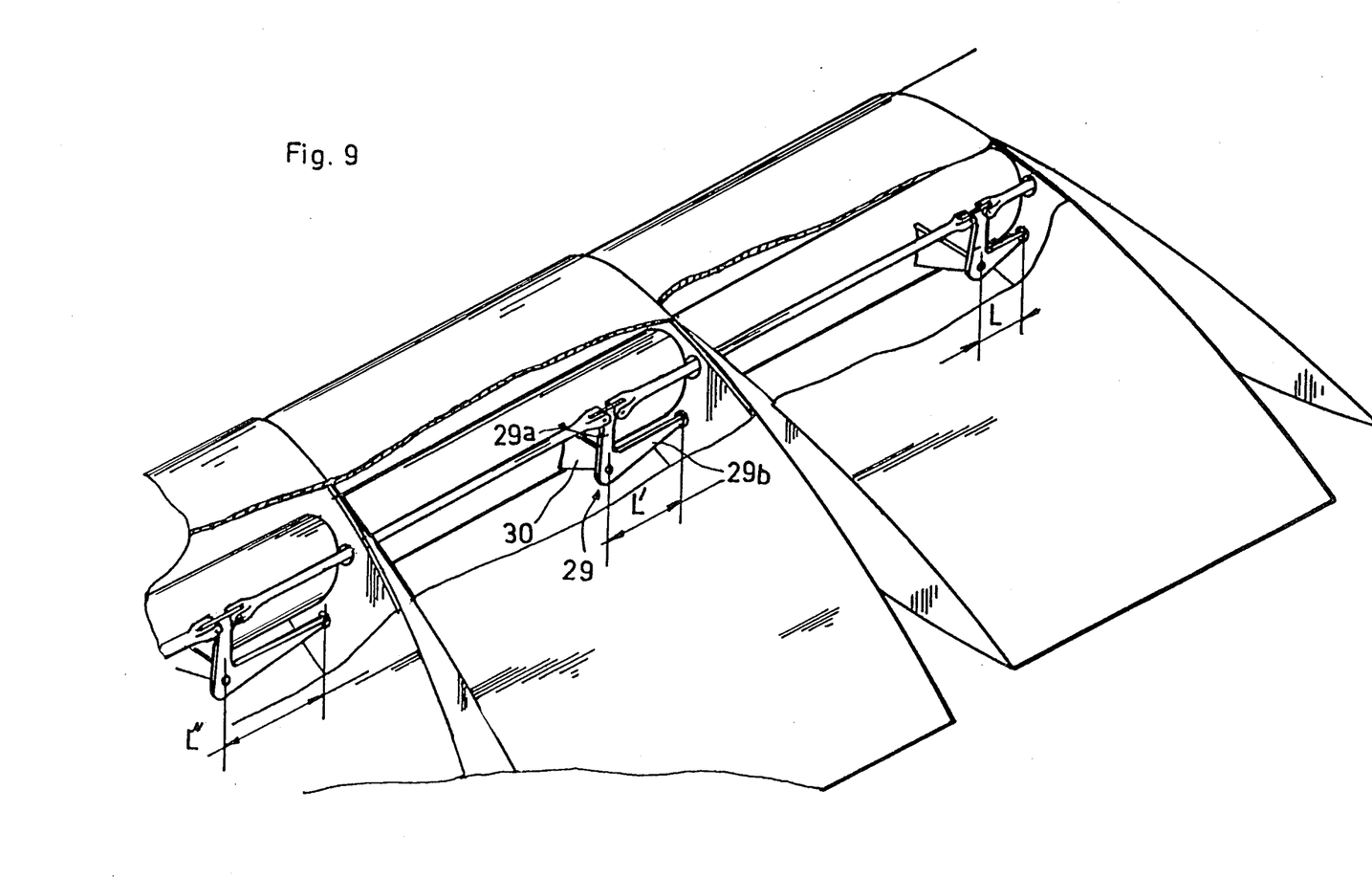
FIG. 9 is a schematic perspective view of another embodiment.

FIG. 9 illustrates schematically another embodiment, in which each crank 29 associated with a sector is carried by the stringer, this crank being articulated about a transverse axis on a plate 30 fixed to the stringer. As previously, each of these cranks 29 comprises a first arm 29a connected to the control device and a second arm 29b actuating the sector under consideration. The second arms of different cranks have differing lengths L, L', L''', adapted to the control of the desired angle of the sectors. In the example, these latter comprise caissons, the rotation of which is caused by forces applied directly to these caissons by the ends of the arms 29b which pass into openings formed in their lateral ribs.

Figure 10:
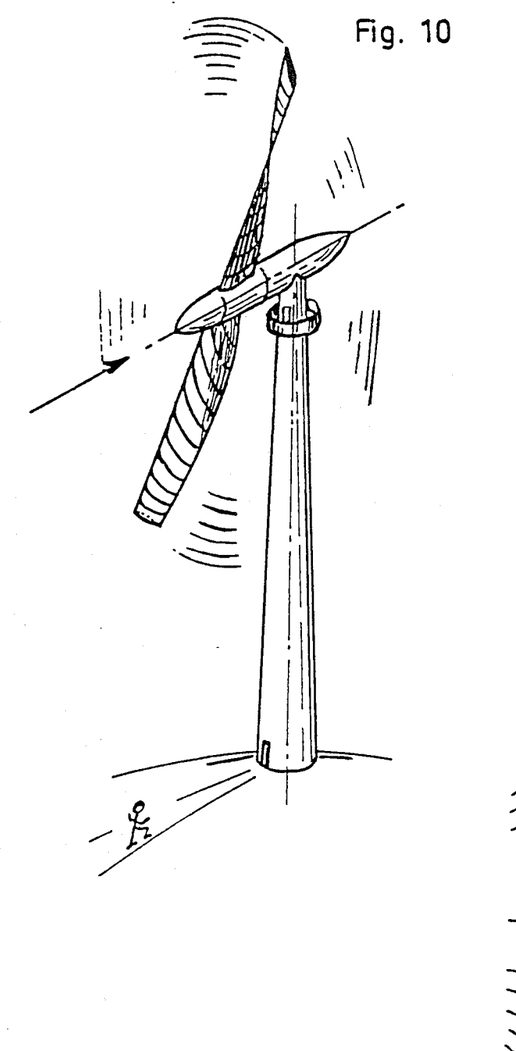
FIGS. 10 and 11 illustrate possible applications of the invention.
Figure 11:
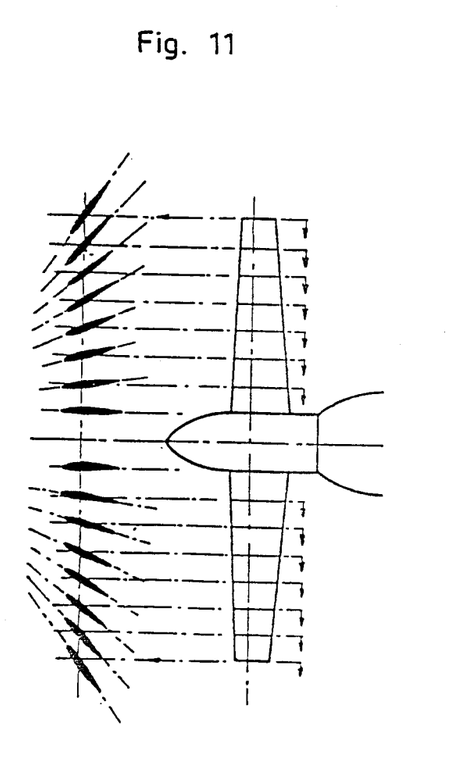
Figure 12:
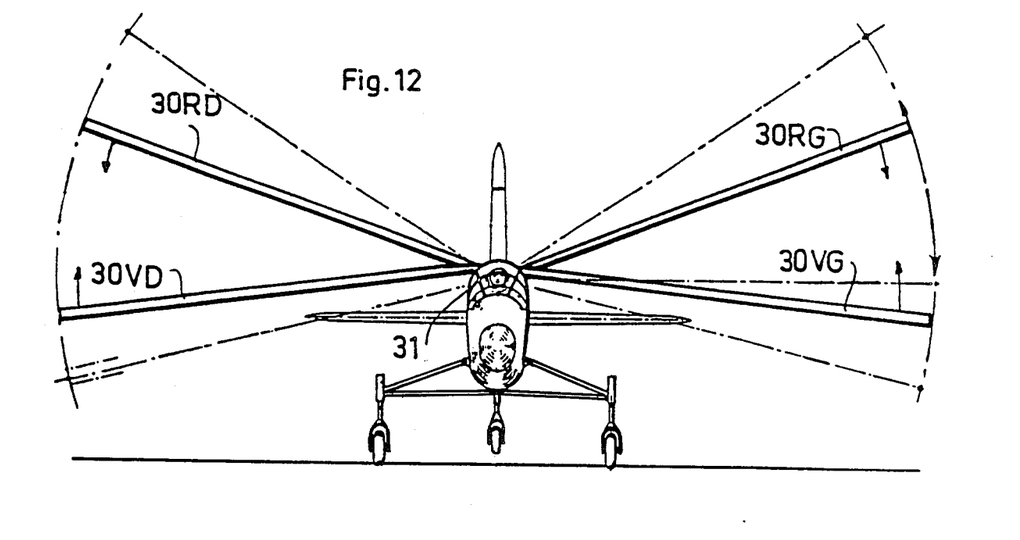
FIGS. 12 and 13 are a front view and a plan view of a beating wing aircraft according to the invention.
Figure 13:
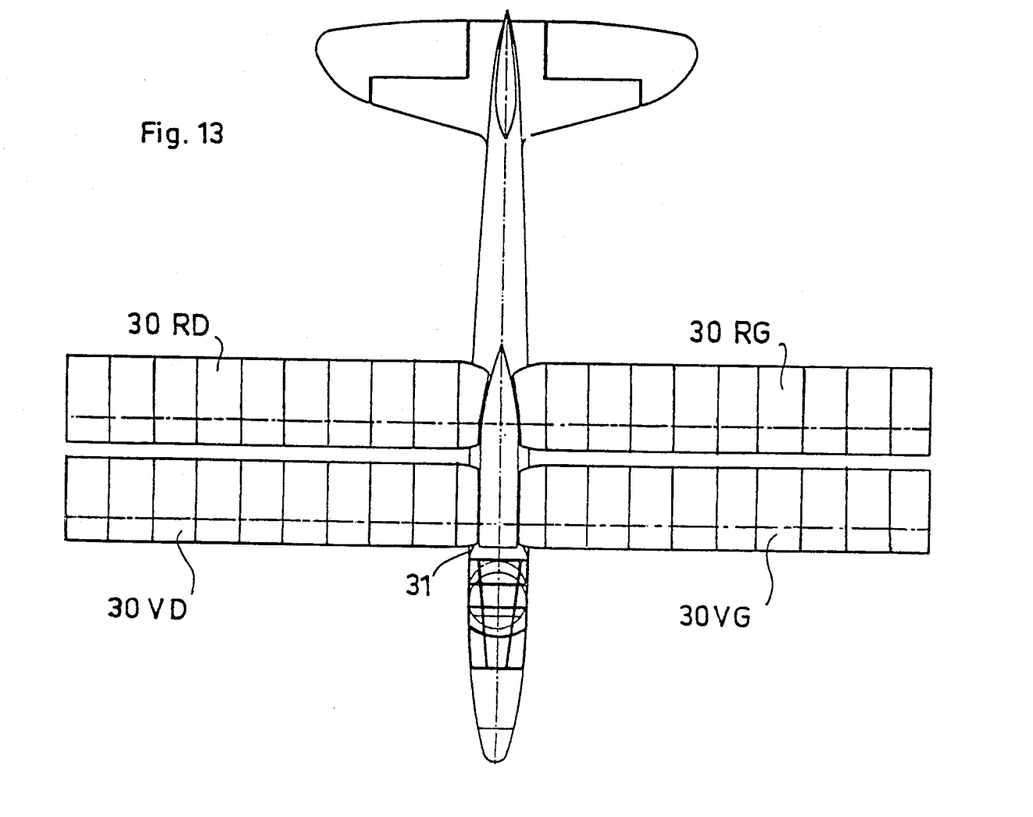

FIGS. 10 and 11 illustrate the invention applied to a windmill. As illustrated in FIG. 11, the sectors have incident angles progressively modified from the hub to the end of the blades, these incident angles being controllable as a function of the speed of the wind for optimizing the efficiency of each sector.

FIGS. 12 through 18 relate to another application of the invention comprising the provision of a beating wing aircraft. To assure an equilibrium of the moving mass, this aircraft comprises four contoured wings of the type described above: two leading wings 30VG and 30VD situated on opposite sides of the fuselage 31 and two trailing wings 30RG and 30RD, also situated on opposite sides of the fuselage. These wings and their actuating means are arranged in such a manner that the two leading wings 30VD and 30VG rise or fall at the same time, and the two rear wings 30RD and 30RG fall or rise at the same time, in opposition to the phase with respect to the leading wings.

Figure 14:
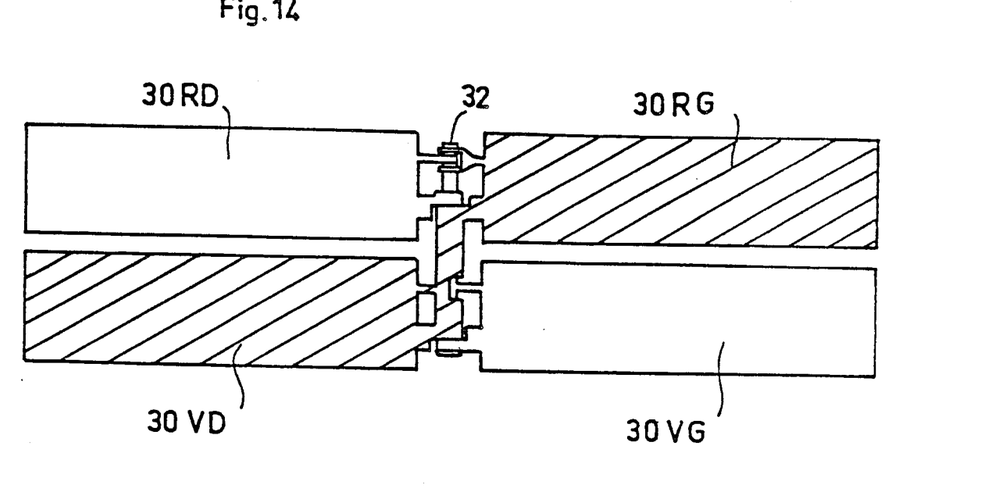
FIG. 14 is a schematic plan view showing the assembly of the wings.

As illustrated schematically in FIG. 14, each leading wing 30VD (or 30VG) is connected to the rear wing on the opposite side 30RG (or 30RD) in such a manner as to form their width and assembly articulated around a central axis 32 carried by the fuselage. The actuating means for the wings is adapted to actuate these two assemblies in opposite phases.

The connection between the opposite wings (30VD and 30RG or 30VG and 30RD) may be a mechanical connection, the wings forming a rigid assembly as shown in FIG. 14. This connection may also be a purely hydraulic connection.

Figure 15:
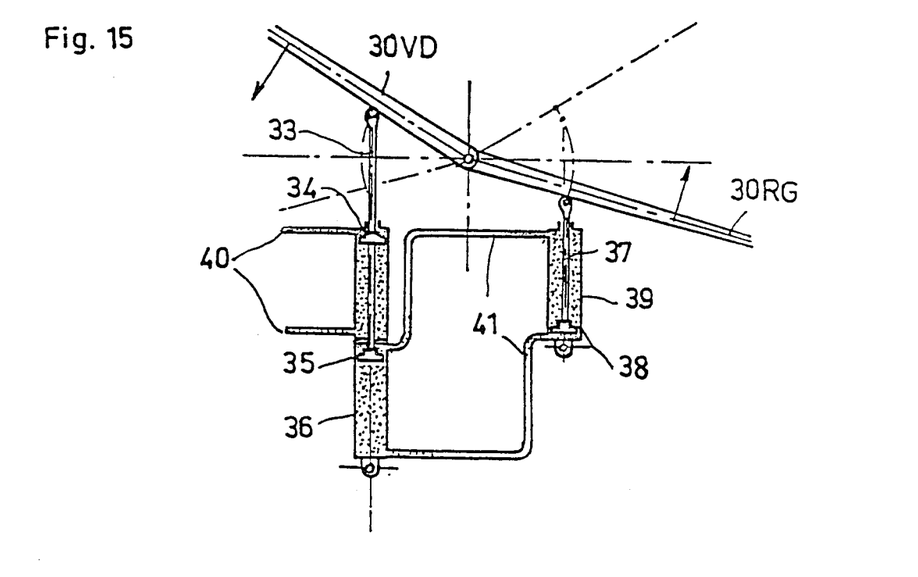
FIG. 15 is a schematic view of hydraulic actuating means for the wings in their beating cycle.

FIG. 15 illustrates schematically an embodiment of such a hydraulic connection for one of the assemblies. A wing 30VD is moved by a connecting rod 33 associated with two pistons 34 and 35 movable in a cylinder; the other wing 30RG is movable by a connecting rod 37 associated with a piston 38 movable in a cylinder 39. The upper portion of the cylinder 36 is connected to an actuating distributor by tubes 40 for the passage of fluid as shown in the drawing, however, the lower portion of the cylinder 36 is coupled with the other cylinder 39 by tubes 41.

The two wings 30VD and 30RG are thus connected hydraulically and moved synchronously in a cyclic beating movement by a cyclic filling and emptying of the distributor. The other pair of wings may be moved by the same distributor through an opposed mounting.

During the course of these beats, the different sectors of the wings are actuated in a repetitive manner by their control device during the operating cycles corresponding to the beating cycles. During these cycles, the incident angles of the sectors thus varies in a cyclical manner in order to confer upon them an optimal efficiency as a function of the sector under consideration (its placement along the profile) and the position of the wing in the beating cycle.

To this effect, the control device for the cranks is associated with cyclic actuating means situated at the juncture line of the wing under consideration.

Figure 16:
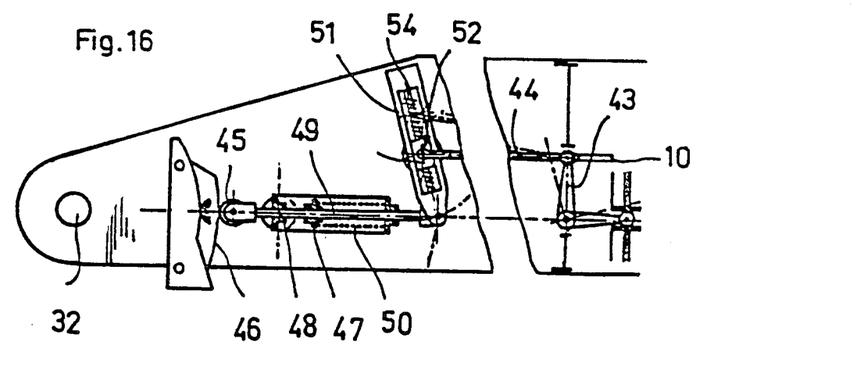
FIG. 16 is a schematic view showing one embodiment of actuating means for the wings for adjusting the angle of the sectors as a function of the position of the wing in the beating cycle.

FIG. 16 shows a first embodiment of this actuating means. Shown in this figure is the first crank (the crank at the juncture with the fuselage) indicated by reference numeral 43 and the first connecting rod 44 of the control device for the cranks. This connecting rod is actuated by a bearing element, in the example a roller 45, which is maintained under pressure against a cam 46, fixed with respect to the wing and fixed on the fuselage (the axis of rotation of the wing has been shown at 32). An amplitude control system is interposed between the member 45 and the connecting rod 44 in order to permit an exterior modification of the pitch during the course of the operating cycles.

In the examples shown, the roller 45 is carried by a tubular rod 47 articulated about a transverse axis 48 carried by the caisson at the juncture of the wing; this connecting rod contains a bar 49 at the extremity of which is fixed the roller 45, a spring 50 urging the roller against the cam 46.

The bar of the connecting rod is through a transverse action to a slide bearing 51 (from the frontal direction) which is articulated about a transverse axis 52 on the connecting caisson. A slide 53 may be moved along this slide bearing by an endless screw 54 which is caused to rotate by a motor (not shown) controlled from the cockpit. Upon this slide block 53 is articulated the first connecting rod 44 for controlling the cranks. The cam 46 permits varying cyclically the incident angles of the sector as a function of the position of the wing in the beating cycle, however, the control of the position of the slide 53 serves to adjust the amplitude of these variations (the amplitude of these variations may be adjusted to a neutral value—neutralizing the influence of the cam—while positioning the slide at the point of articulation 52 of the slide block).

The profile of the cam 46 is provided in such a manner as to generate inversions of the appropriate incident angles during changing of the direction of the beat. These inversions may be optimized as a function of the inertial forces for being, at a given time, rapid in order to obtain good efficiency of the lift and/or propulsion, and progressively in order to be compatible with the mechanical resistance of the structures.

Figure 17:
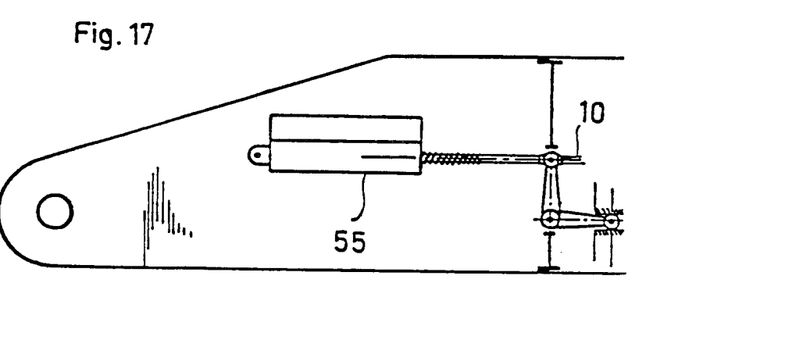
FIG. 17 is a schematic view of another embodiment of this actuating means.

FIG. 17 illustrates a variation in which the actuating means of the control rod device comprises a programmable robot 55, capable of actuating in a cyclical manner the first connecting rod of the control device. This robot also permits obtaining changes of the pitch due to the program parameter from external data.

Figure 18:
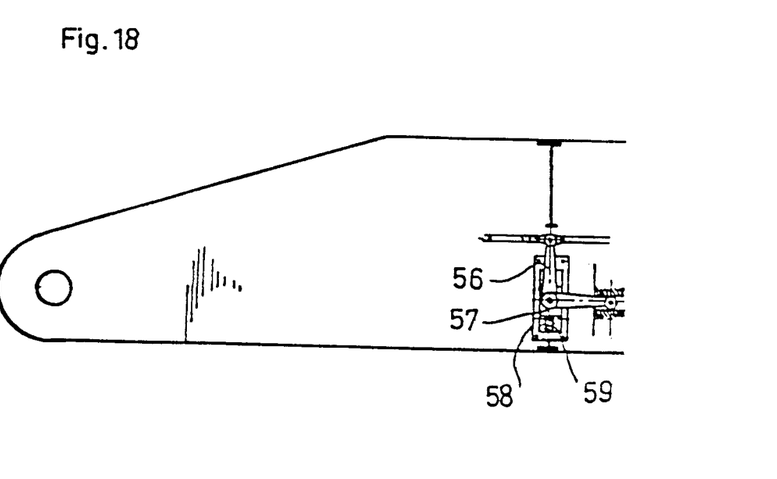
FIG. 18 is a schematic view showing operating means permitting overall changing of the general angle on incidence of the wing.

Further, FIG. 18 illustrates a variation comprising means for changing overall the general angle of the wing particularly during take-off or landing phases.

In this variation, the first crank (reference numeral 56 in this drawing) which is situated toward the juncture in the fuselage and carried by the caisson fixed to this juncture is articulated about a transverse slide 57, which is associated with operating means permitting varying the position. In the example, this slide moveable in the frontal direction is mounted in a slide block 58 fixed to the caisson at the juncture and containing an endless screw 59 which may be caused to turn by means of a motor (not shown) controlled from the cockpit.

While this invention has been described as having certain preferred features and embodiments, it will be understood that it is capable of still further variation and modification without departing from the spirit of the invention, and this application is intended to cover any and all variations, modifications and adaptations of the invention as fall within the spirit of the invention and the scope of the appended claims.

I claim:

1. A profiled wing for use as an airfoil or a blade, comprising an axial stringer (3), a plurality of wing sectors (1, 2) juxtaposed along said wing, each of said sectors being articulated on said stringer so as to be pivotable therearound, angular positioning means for positioning said sectors with respect to said stringer, said angular positioning means for said sectors comprising a series of cranks (7, 23, 29) one associated with each sector in such a manner as to fix the angular position of said sector with respect to said stringer (3), and control means for said cranks (10) for causing pivotal movement of said cranks and thereby establishing a predetermined position for each of said cranks as a function of the desired angle for each sector of the wing (1, 2), each sector being covered by a deformable covering surface (11, 12) resting upon two ribs (6), and said deformable covering comprising, at the point of each sector, a top surface (11) and a bottom surface (12) able to undergo a twisting motion and maintained against two adjacent ribs (6) in such a manner as to be able to slide independently one with respect to the other when said ribs assume different angles.

2. A profiled wing as in claim 1, and wherein each top surface (11) or bottom (12) surface comprises a covering sheet (13) supported by stiffeners, of which two lateral edges (14) overlap the ribs (6) and two edges (15) situated along the leading edges and the trailing edges form sliding surfaces, the top surface contour and the bottom surface contour being connected by connecting members (17) for maintaining them against said ribs (6) while permitting their relative sliding.

3. A profiled wing for use as an airfoil or a blade, comprising an axial stringer (3), a plurality of wing sectors (1, 2) juxtaposed along said wing, each of said sectors being articulated on said stringer so as to be pivotable therearound, angular positioning means for positioning said sectors with respect to said stringer, said angular positioning means for said sectors comprising a series of cranks (7, 23, 29) one associated with each sector in such a manner as to fix the angular position of said sector with respect to said stringer (3), and control means for said cranks (10) for causing pivotal movement of said cranks and thereby establishing a predetermined position for each of said cranks as a function of the desired angle for each sector of the wing (1, 2), each crank (7, 23) associated with a given sector of the wing being supported by the preceding sector and articulated thereon about a transverse axis, said crank comprising first arm (7a) connected to said control means (10) for controlling the rotation of said crank with respect to the preceding sector, and a second arm (7b) articulated about said wing sector under consideration for conferring upon said sector a predetermined angular position about said stringer (3), for assigning to different sectors of the wing (1, 2) progressively variable angles, each sector of the wing (1, 2) comprising at least one transverse rib (6, 21) and a rigid caisson structure (5, 20), a cradle, or a triangular structure articulated about said stringer (3), control rods (10, 24) articulated about transverse axes on said first arms (7a) of said cranks for connecting them in pairs, while said second arm of each crank is articulated with the interposition of a connecting link (9) and transverse axes to said rigid structure (5, 20) of the corresponding wing sector.

4. A profiled wing as in claim 3, and wherein each rib (6) is fixed to said rigid structure (5) of the corresponding sector, each crank (7) associated with a given sector being supported by the rib (6) or the structure (5) of the preceding sector.

5. A profiled wing as in claim 3, and wherein said structure (20) and said rib (21) of each sector are articulated independently about said stringer, each crank (23) associated with a given sector being supported by the rigid structure (20) of the preceding sector and being provided with means (19, 26, 27, 28) for angularly positioning said rib (21) of said sector for individually directing an adjustment of the angle of each rib.

6. A profiled wing as in claim 5, and wherein said angular positioning means associated with each crank (23) comprises a cam (19) fixed to said crank and having a profile adapted to the adjustment of the angle to be achieved, a pressure roller (26), fixed to the rigid structure (20), a control roller (27) fixed to said rib (21) and elastic means (28) connecting said rigid structure and said rib for maintaining the cam followers (26) and controlled rollers (27) under pressure against the cam (19).

7. A profiled wing as in claim 3, and wherein each sector of the wing comprises a caisson or cradle (20) under lateral pressure against the caisson or cradle of the adjacent sector by means of a roller (42) or slide, permitting rotation of said sectors one with respect to another about said stringer, the caisson or cradle of one of the two sectors at the ends of the wing coming into contact by a roller or slide against a fixed caisson or cradle, while the caisson or cradle of the opposite extremity sector is urged toward the adjacent sector by elastic means maintaining the stacking of the sectors in coupled positions.

8. A profiled wing as in claim 3 for providing a cyclic functioning and wherein in that the control means for said cranks is associated with cyclic actuating means (44–50), situated at the juncture of the wing and adapted to actuate the control device in a repetitive manner during the operating cycles.

9. A profiled wing as in claim 8, characterized in that:
the control means comprises connecting rods (10) connecting said cranks in pairs,
actuating means comprising a cam (46) adapted to be followed by a follower member (45) during the course of an operating cycle, said following member being carried by the wing in the vicinity of the juncture with the plane and to remain under pressure against the cam and actuate a first connecting rod (44) of the control device, being articulated about the first crank (43).

10. A profiled wing as in claim 9, and including an amplitude control system (51–54) interposed between the follower member (45) and the connecting rod (44), which it actuates, for causing an exterior modification of the pitch during the course of the operating cycles.

11. A profiled wing as in claim 8, and wherein:
the control device comprises connecting rods (10) connecting said cranks in pairs,
the actuating means comprises a programmable robot (55) able to actuate in a cycle a first connecting rod of the control device, articulating about the first crank.

12. A contoured wing as in claim 11 and wherein the first crank (56) situated toward the juncture with the fuselage is supported by a caisson fixed at said juncture and is articulated about a slide (56) movable according to a frontal direction and associated with maneuvering means (57, 59) permitting variation of the position for changing the overall angle of the wing.

13. A beating wing aircraft comprising a fuselage (31) and on opposite sides thereof at least two contoured wings as in claim 8, said wings (30) being articulated about said fuselage and associated with means (33–41) for generating a cyclic beating movement, the cyclic actuating means of each wing being adapted to confer to the sectors thereof an incident angle varying in a cyclic manner as a function of position of the wing in the beating cycle.

14. An aircraft with beating wings as in claim 13, and comprising four of said wings, two leading wings (30VD, 30VG) situated on opposite sides of the fuselage, and two trailing wings (30RD, 30RG) situated on opposite sides of said fuselage, said wings and their operating means being provided in such a manner that the two leading wings (30VD, 30VG) rise or fall at the same time, and that the two trailing wings (30RD, 30RG) fall or rise at the same time, in opposite phase with respect to the leading wings.

15. A beating wing aircraft as in claim 14, and wherein each leading wing (30VD, 30VG) is connected to the trailing wing (30RG, 30RD) situated on the opposite side of the fuselage in such a manner as to form therewith an assembly articulated about a central axis (32) in said fuselage (31), said actuating means (33–41) being adapted to operate said two assemblies in opposite phase.

* * * * *